J. E. JOHNSON.
COFFEE POT.
APPLICATION FILED JUNE 3, 1912.
1,059,049.
Patented Apr. 15, 1913.
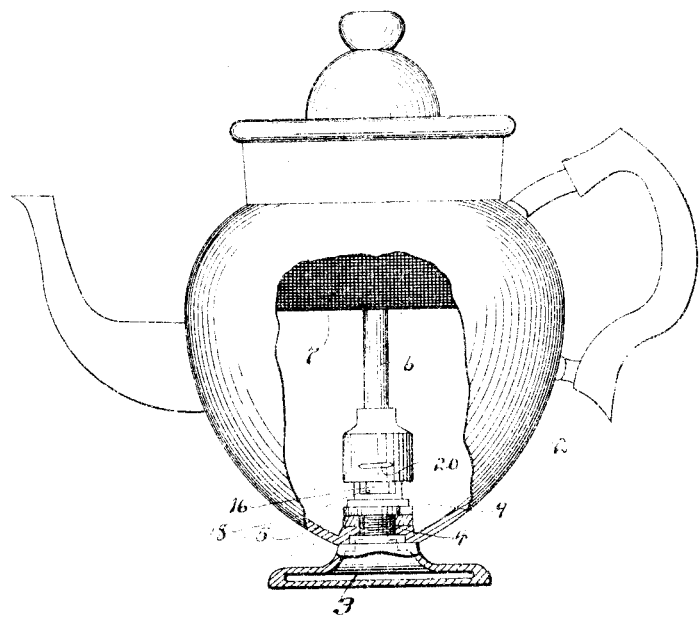
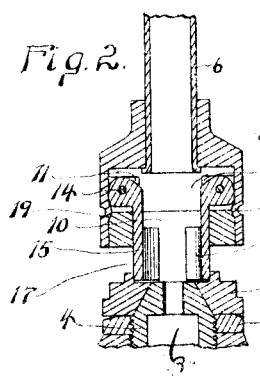
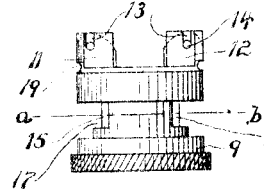
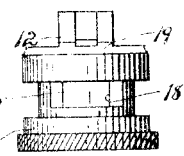
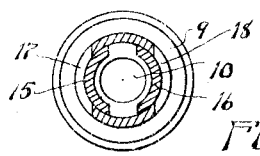
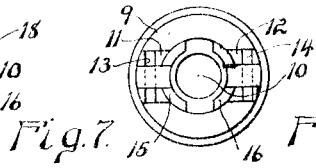
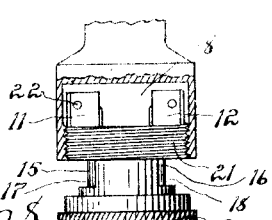
Witnesses
C. L. Weed
M. P. Nichols
Joseph Edward Johnson
Inventor
by Seymour & Earle
Attys

UNITED STATES PATENT OFFICE.

JOSEPH EDWARD JOHNSON, OF MERIDEN, CONNECTICUT.

COFFEE-POT.

1,059,049.  Specification of Letters Patent.  Patented Apr. 15, 1913.

Application filed June 3, 1912. Serial No. 701,341.

*To all whom it may concern:*

Be it known that I, JOSEPH EDWARD JOHNSON, a citizen of the United States, residing at Meriden, in the county of New Haven and State of Connecticut, have invented a new and useful Improvement in Coffee-Pots; and I do hereby declare the following, when taken in connection with the accompanying drawings and the characters of reference marked thereon, to be a full, clear, and exact description of the same, and which said drawings constitute part of this application, and represent, in—

Figure 1 a side view partly in section of a coffee pot constructed in accordance with my invention. Fig. 2 a vertical sectional view showing the valve chamber and valve block with the coöperating parts. Fig. 3 a side view of the valve block detached. Fig. 4 a view at right angles to Fig. 3. Fig. 5 a top or plan view of the valve block. Fig. 6 a sectional view on the line $a$—$b$ of Fig. 3. Fig. 7 a face view of one of the valves detached. Fig. 8 a side view of the same. Fig. 9 a broken sectional view illustrating a modification of the manner of securing the valve block in the valve chamber.

This invention relates to an improvement in coffee pots, and particularly to coffee pots in which the coffee is made by percolation.

The object of the invention is to provide simple and effective means for permitting the liquid to enter the generating chamber; and the invention consists in the construction hereinafter described and particularly recited in the claims.

In carrying out my invention, I employ a coffee pot 2 of any approved design provided at the base with a generating chamber 3 at the top of which is a nipple 4 which is secured in the usual way by a locking ring 5. In connection with a pot thus formed I employ the usual central tube 6 extending through the cup-like strainer 7 near the upper end in which the coffee is placed, and at the end of the lower tube is a valve chamber 8.

Sitting over the nipple 4 is a valve block 9 the upper end of which enters the valve chamber 8. This valve has a comparatively large central passage 10 and is provided at its upper end with integral lugs 11 and 12 which lugs may be formed with notches 13 to receive trunnions 14 of valves 15, 16, these valves being curved corresponding to the inner walls of the valve block which block is formed with ports 17 and 18 in opposite walls of the block. The bases of the lugs 11 are formed with grooves 19 adapted to be engaged by ribs 20 struck inward from the side walls of the valve chamber 8 and so that the valve chamber may be interlocked with the valve block and in such position that the ports 17 and 18 will stand below the bottom of the valve chamber and be normally closed by the valves which are hinged to the top of the block.

It is apparent and as shown in Fig. 9 that the lower portion of the inner wall of the valve chamber might be screw threaded to engage with threads formed around the head 21 of the valve block, and instead of forming the valves with trunnions to enter notches in the lugs 11 and 12, they may be secured by pins 22 extending through the lugs and through the upper ends of the valves.

In operation, liquid in the pot 2 will pass through the ports 17 and 18 into the generating chamber 3, the valves moving inward to permit such entrance. When, however, the generating chamber is filled, the valves will close and remain closed until the liquid in the generating chamber has reached the boiling point when it will be forced up through the central tube 6 into the coffee-containing strainer at the top of the pot. As the liquid is discharged from the generating chamber, the valves will yield to allow additional liquid from the pot to enter the generating chamber so that the device is purely automatic and maintains a perfect circulation for liquid into the generating chamber and from that to the strainer. By arranging the valve block to extend below the valve chamber free access is had to the ports in the valve block, and this construction permits the ready disengagement of the valve block from the valve chamber for the purpose of cleaning.

I claim:—

1. The combination with a coffee pot provided with a generating chamber at its bottom and with a nipple at the upper end of said chamber, of a valve block formed with a vertical passage adapting the valve block to set over the said nipple, a central tube provided at its lower end with a valve chamber into which the upper end of the valve block extends, means for locking the valve block in said chamber, said valve block formed on opposite sides below said valve chamber with ports, and valves connected with the upper end of the block and adapted to close said ports.

2. The combination with a coffee pot provided with a generating chamber at its bottom and with a nipple at the upper end of said chamber, of a valve block formed with a round vertical passage adapting the valve block to set over said nipple, a central tube provided at its lower end with a valve chamber into which the upper end of the valve block extends, means for interlocking the valve block with said chamber, said valve block formed on opposite sides with ports, segmental valves connected with the valve block near its upper end and adapted to close said ports.

3. The combination with a coffee pot formed at the base with a generating chamber and a nipple at the upper end of said chamber, a central tube provided at its lower end with a valve chamber, a valve block formed with a central opening to set over said nipple, the upper end of the block entering said valve chamber with which it is interlocked, said valve block formed on opposite sides below the lower edge of said chamber with ports, and at the upper ends with notched lugs, and valves provided with trunnions adapted to enter said notches whereby they are hinged to the valve block, said valves extending downward into the central opening and across the ports.

In testimony whereof, I have signed this specification in the presence of two subscribing witnesses.

JOSEPH EDWARD JOHNSON.

Witnesses:
F. J. EKMARK,
C. H. ELMORE.